(12) United States Patent
Gorokhov

(10) Patent No.: US 8,542,615 B2
(45) Date of Patent: Sep. 24, 2013

(54) TRANSMISSION OF CONTROL INFORMATION WITH CONFIGURABLE TIMELINE IN A WIRELESS COMMUNICATION SYSTEM

(75) Inventor: Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 12/812,906

(22) PCT Filed: Feb. 12, 2009

(86) PCT No.: PCT/US2009/033974
§ 371 (c)(1),
(2), (4) Date: Oct. 27, 2010

(87) PCT Pub. No.: WO2009/108509
PCT Pub. Date: Sep. 3, 2009

(65) Prior Publication Data
US 2011/0182215 A1    Jul. 28, 2011

Related U.S. Application Data

(60) Provisional application No. 61/029,853, filed on Feb. 19, 2008.

(51) Int. Cl.
*H04J 3/00* (2006.01)
*H04B 7/204* (2006.01)
*H04W 4/00* (2009.01)
*H04W 72/00* (2009.01)

(52) U.S. Cl.
USPC ............ 370/280; 370/319; 370/329; 455/450

(58) Field of Classification Search
USPC .......................................... 370/280, 321, 294
See application file for complete search history.

(56) References Cited

U.S. PATENT DOCUMENTS
7,339,949 B2    3/2008    Suzuki et al.
(Continued)

FOREIGN PATENT DOCUMENTS
JP    11355860 A    12/1999
JP    2003179581 A    6/2003
(Continued)

OTHER PUBLICATIONS

International Search Report & Written Opinion—PCT/US2009/033974, International Search Authority—European Patent Office—Aug. 19, 2009.

(Continued)

*Primary Examiner* — Michael Thier
*Assistant Examiner* — Brian Cox
(74) *Attorney, Agent, or Firm* — Howard Seo

(57) ABSTRACT

Techniques for sending acknowledgement (ACK) and/or other control information with a configurable timeline are described. A receiver may have limited processing resources and may need different amounts of time to process different amounts of data. The receiver may send ACK information earlier (or later) if less (or more) receive processing time is required. In one design, the receiver may receive a transmission of data in accordance with a grant, decode the received transmission to recover the data, and determine ACK information based on decoding result. The receiver may determine a frame to send the ACK information based on the grant. The determined frame may be one of multiple frames available for sending the ACK information. For example, different grant sizes may be associated with different frames. The receiver may send the ACK information for the transmission of data in the determined frame.

25 Claims, 10 Drawing Sheets

(56) References Cited

U.S. PATENT DOCUMENTS

| | | |
|---|---|---|
| 7,636,328 B2 | 12/2009 | Teague et al. |
| 2007/0058605 A1 | 3/2007 | Meylan et al. |
| 2007/0109988 A1 | 5/2007 | Sampath |
| 2007/0133458 A1 | 6/2007 | Chandra et al. |
| 2007/0211616 A1* | 9/2007 | Khandekar et al. ........... 370/203 |

FOREIGN PATENT DOCUMENTS

| | | |
|---|---|---|
| JP | 2008524938 A | 7/2008 |
| JP | 2009512277 A | 3/2009 |
| KR | 20030017401 A | 3/2003 |
| WO | 2007044414 A1 | 4/2007 |

OTHER PUBLICATIONS

Qualcomm Europe: "UL control details for TDD" SGPP Draft; RI-073263, 3rd Generation Partnership Project (SGPP), Mobile Competence Centre ; 650, Route Des Lucioles ; F-06921 Sophia-Antipolis Cedex ; France, vol. RAN WG1, No. Athens, Greece; Aug. 20, 2007, Aug. 15, 2007, XP050106898 p. 2, line 13-line 32.
International Search Report—PCT/US2009/033974, International Search Authority—European Patent Office, Aug. 19, 2009.
Written Opinion—PCT/US2009/033974, International Search Authority—European Patent Office—Aug. 19, 2009.
3GPP TSG RAN1 #50, R1-073263, "UL control for details for TDD", vol. RAN WG1, p. 2, II. 13-32, Aug. 2007.

* cited by examiner

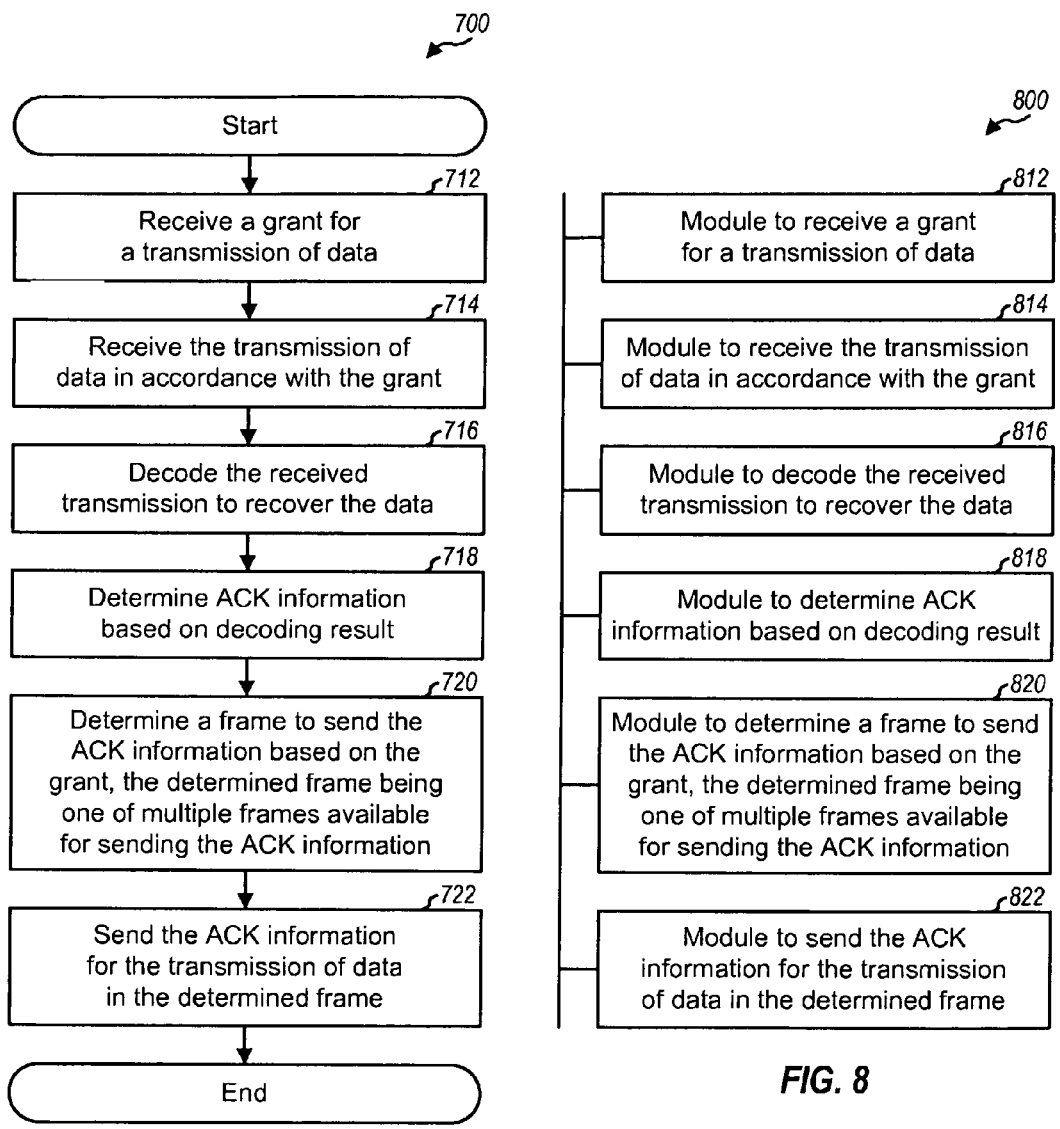

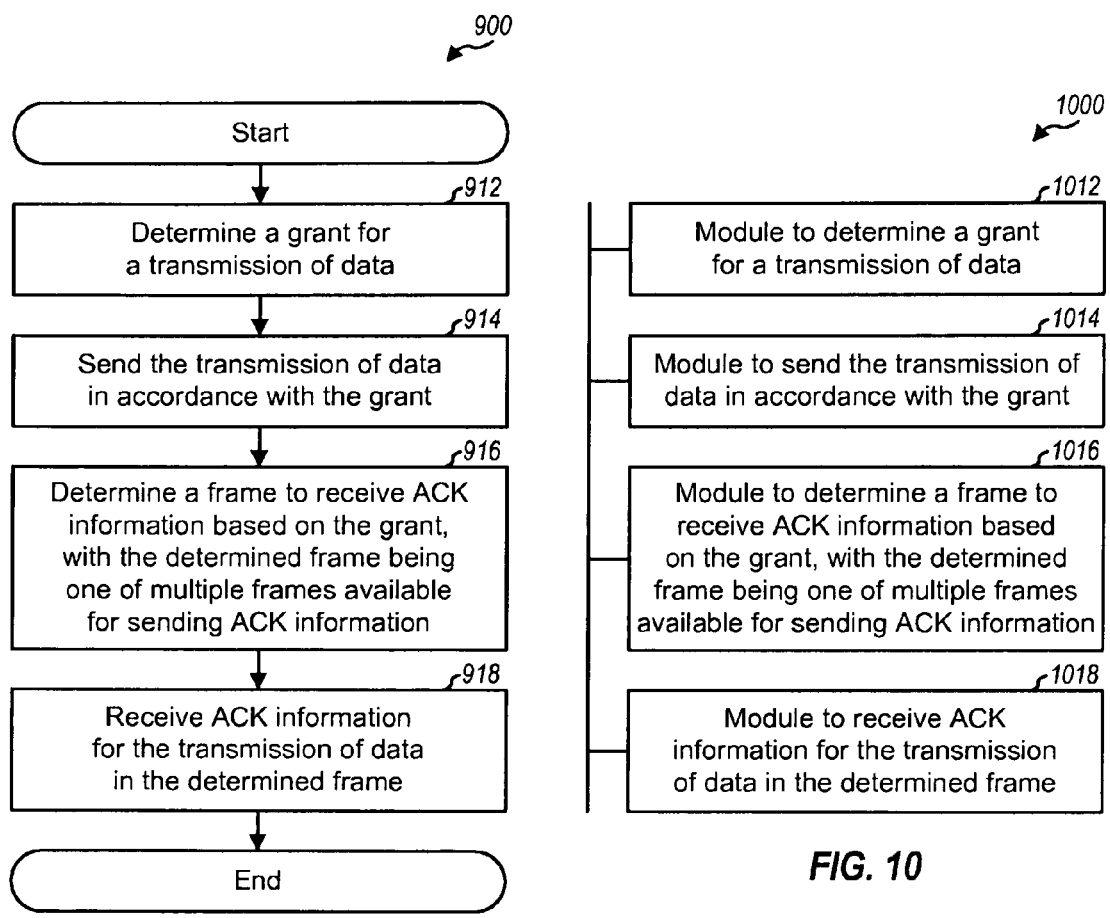

TRANSMISSION OF CONTROL INFORMATION WITH CONFIGURABLE TIMELINE IN A WIRELESS COMMUNICATION SYSTEM

The present application claims priority to provisional U.S. Application Ser. No. 61/029,853, entitled "UMB TDD FRAMEWORK," filed Feb. 19, 2008, assigned to the assignee hereof and incorporated herein by reference.

BACKGROUND

I. Field

The present disclosure relates generally to communication, and more specifically to techniques for sending control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a transmitter (e.g., a base station) may encode data and send a transmission of the data to a receiver (e.g., a terminal). The receiver may receive and decode the transmission to recover the data sent by the transmitter. The receiver may generate acknowledgement (ACK) information based on decoding result. The ACK information may comprise an ACK to indicate that the transmission was decoded correctly or a negative acknowledgement (NAK) to indicate that the transmission was decoded in error. The receiver may send the ACK information and possibly other control information to the transmitter to support data transmission by the transmitter. It is desirable to send ACK and other control information in a manner to obtain good performance.

SUMMARY

Techniques for sending ACK information and/or other control information with a configurable timeline in a wireless communication system are described herein. In an aspect, ACK information may be sent with different frame offsets (instead of a fixed frame offset) to provide different receive processing time for a receiver. The receiver may have limited processing resources and may need different amounts of time to process different amounts of data. The receiver may send ACK information earlier if less receive processing time is required or later if more receive processing time is needed.

In one design, the receiver may receive a grant for a transmission of data. The grant may indicate the amount of resources for the transmission of data, the amount of data to send, etc. The receiver may receive the transmission of data in accordance with the grant, decode the received transmission to recover the data, and determine ACK information based on decoding result. The receiver may determine a frame to send the ACK information based on the grant. The determined frame may be one of multiple frames available for sending the ACK information. The receiver may then send the ACK information for the transmission of data in the determined frame.

In one design, different grant sizes may be associated with different frames for sending the ACK information. Progressively larger grants may be associated with frames that are progressively further away from the transmission of data in order to provide more receive processing time for the receiver. The receiver may determine the frame for sending the ACK information based on the size of the grant. In another design, the grant may indicate a node assigned for the transmission of data. The assigned node may be one of a plurality of nodes in a channel tree and may be associated with specific resources for sending data. Each node in the channel tree may also be associated with a specific frame for sending ACK information. The receiver may determine the frame for sending the ACK information based on the assigned node.

The techniques described herein may be used to send ACK information (as described above) as well as other control information, pilot, etc. A given information may be sent in different frames depending on the required processing time to generate or use the information. Various aspects and features of the disclosure are also described in further detail below.

BRIEF DESCRIPTION OF THE DRAWINGS

FIG. 7 shows a process for receiving a data transmission.
FIG. 8 shows an apparatus for receiving a data transmission.
FIG. 9 shows a process for sending a data transmission.
FIG. 10 shows an apparatus for sending a data transmission.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies.

Figure 1:
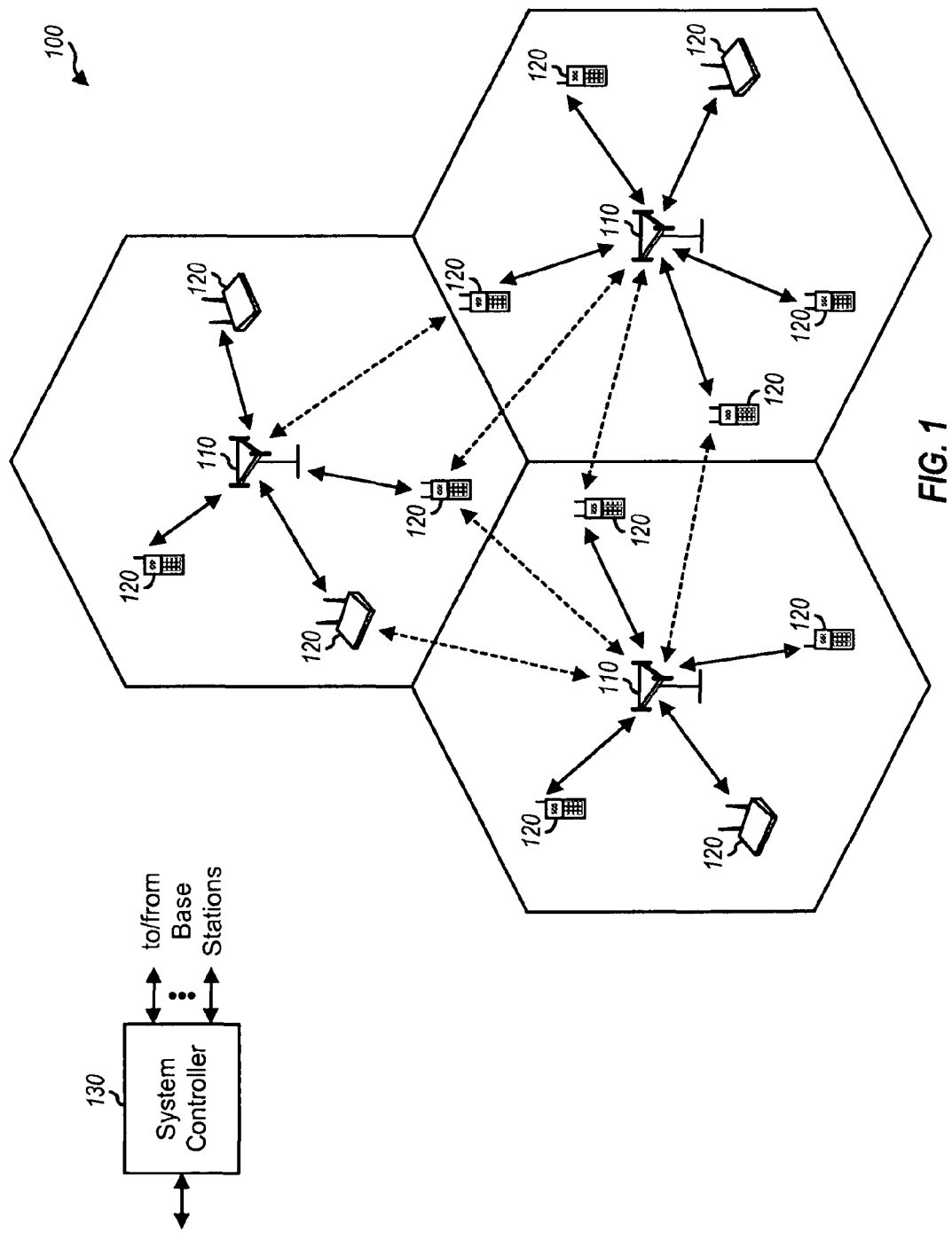
FIG. 1 shows a wireless communication system.

FIG. 1 shows a wireless communication system 100, which may include a number of base stations 110 and other network entities. A base station may be a station that communicates with the terminals and may also be referred to as a Node B, an evolved Node B, an access point, etc. Each base station 110 may provide communication coverage for a particular geographic area. The term "cell" can refer to a coverage area of a base station and/or a base station subsystem serving this coverage area, depending on the context in which the term is used. A system controller 130 may couple to a set of base stations and provide coordination and control for these base stations.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station on the forward and reverse links. The forward link (or downlink) refers to the communication link from the base station to the terminal, and the reverse link (or uplink) refers to the communication link from the terminal to the base station. In FIG. 1, a solid line with double arrows indicates desired data transmission between a terminal and a serving base station. A dashed line with double arrows indicates interfering transmission between a terminal and an interfering base station.

The system may support HARQ in order to improve reliability of data transmission. For HARQ, a transmitter may send a transmission of a packet and may send one or more additional transmissions, if needed, until the packet is decoded correctly by a receiver, or the maximum number of transmissions has been sent, or some other termination condition is encountered.

Figure 2:
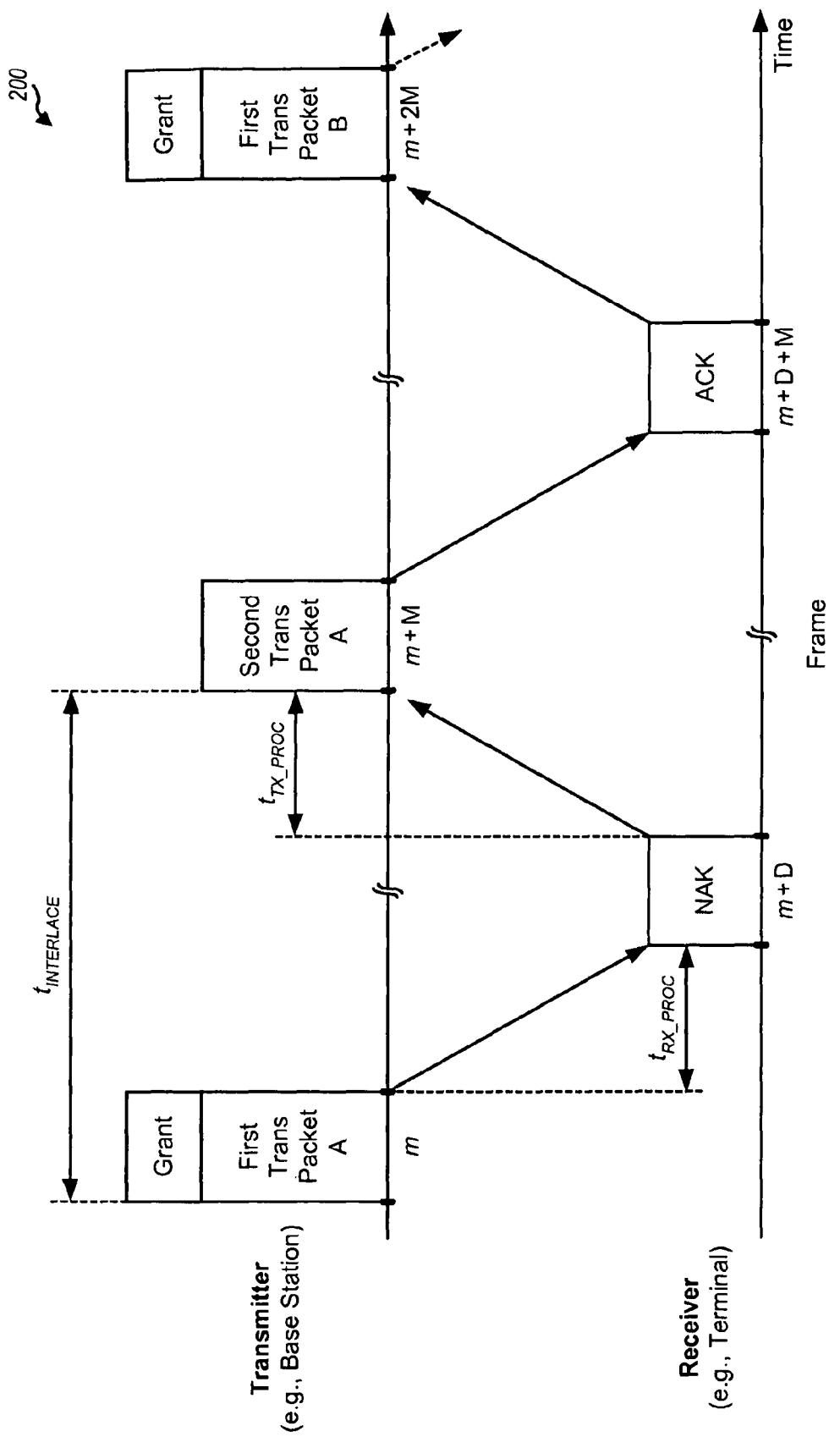
FIG. 2 shows data transmission with hybrid automatic retransmission (HARQ).

FIG. 2 shows an example data transmission scheme 200 with HARQ. The transmission timeline may be partitioned into units of frames. Each frame may cover a predetermined time duration, e.g., 1 milliseconds (ms). A frame may also be referred to as a subframe, a slot, etc.

A transmitter (e.g., a base station) may have data to send to a receiver (e.g., a terminal). The transmitter may process a data packet A in accordance with a selected modulation and coding scheme (MCS) to obtain data symbols. The transmitter may generate and send a grant as well as a first transmission of packet A in frame m to the receiver. The grant may indicate the resources used for the transmission, the selected MCS, etc. The grant may also be referred to as a resource grant, an assignment, etc. The receiver may receive and process the first transmission in accordance with the grant and may decode packet A in error. The receiver may then send a NAK in frame m+D to the transmitter, where $D \geq 1$. The transmitter may receive the NAK and may send a second transmission of packet A in frame m+M to the receiver, where M>1. The receiver may receive the second transmission, process the first and second transmissions, and decode packet A correctly. The receiver may then send an ACK in frame m+D+M to the transmitter. The transmitter may receive the ACK and terminate transmission of packet A. The transmitter may then select an MCS, process another packet B in accordance with the selected MCS, and send a grant as well as a first transmission of packet B in frame m+2M to the receiver. Transmission of packets and ACK information may continue in similar manner.

For synchronous HARQ, M HARQ interlaces with indices 1 through M may be defined for each of the forward and reverse links, where M may be equal to 4, 6, 8 or some other value. Each HARQ interlace may include frames that are spaced apart by M frames. For example, HARQ interlace m may include frames m, m+M, m+2M, etc., for $m \in \{1, \ldots, M\}$, where m is an interlace index. A packet may be sent in one HARQ interlace, and all transmissions of the packet may be sent in different frames of the HARQ interlace, as shown in FIG. 2. A transmission of a packet may be referred to as an HARQ transmission, a packet transmission, etc.

For asynchronous H-ARQ, each HARQ transmission may be scheduled and sent in any frame. For a given packet, the amount of resources, the location of the resources, the MCS and/or other parameters may change for different transmissions of the packet. The techniques described herein may be used for both synchronous and asynchronous HARQ. For clarity, much of the description below is for synchronous HARQ.

As used herein, ACK information may comprise ACK, NAK, and/or other information indicative of decoding result at a receiver. An ACK transmission is a transmission of ACK information. An ACK resource is resource used to send ACK information and may comprise time, frequency, code and/or other resources. An ACK frame is a frame in which ACK information is sent.

The time duration between consecutive transmissions of a packet may be referred to as the interlace duration and may be denoted as $t_{INTERLACE}$, as shown in FIG. 2. The interlace duration may be dependent on the number of HARQ interlaces as well as the frame duration. For example, if each frame has a duration of 1 ms and eight HARQ interlaces are available, then the interlace duration may be equal to 8 ms, and consecutive transmissions of a packet may be spaced apart by 8 ms. The interlace duration may be a fixed or configurable value depending on the system design The time duration from the end of a packet transmission to the start of an ACK transmission may be referred to as the available receive processing time and may be denoted as $t_{RX\_PROC}$, as shown in FIG. 2. The time duration from the end of the ACK transmission to the start of the next packet transmission may be referred to as the available transmit processing time and may be denoted as $t_{TX\_PROC}$, as also shown in FIG. 2. For a given interlace duration, the ACK frames may be selected such that sufficient receiving processing time is available for the receiver and sufficient transmit processing time is available for the transmitter. The ACK frames are typically at a fixed offset of D (in units of frames) from the frames used for packet transmissions, as shown in FIG. 2.

In an aspect, ACK information may be sent with a configurable timeline in order to provide sufficient receive processing time for a receiver and/or sufficient transmit processing time for a transmitter. The receiver may have limited processing resources and may need more time to process a transmission of a larger packet or more packets. The receiver may also need more time to process certain types of transmission than other types of transmission. For example, the receiver may need more time for a multiple-input multiple-output (MIMO) transmission than a single-input single-output (SISO) transmission. The receiver may send ACK information earlier if less processing time is required or later if more processing time is needed.

Figure 3:
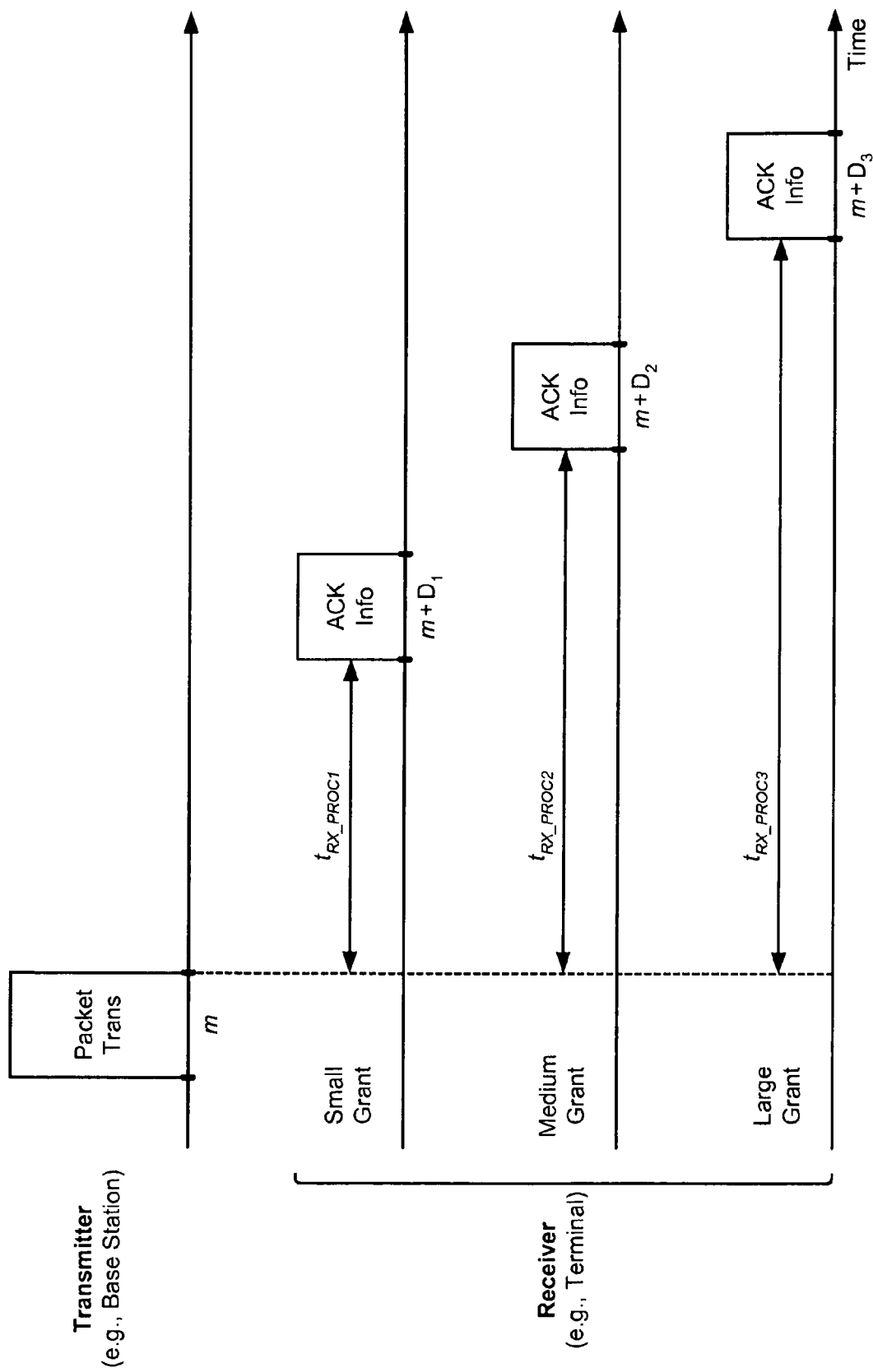
FIG. 3 shows ACK transmission with a configurable timeline.

FIG. 3 shows a design of ACK transmission with a configurable timeline. A transmitter may send a transmission of one or more packets in accordance with a grant in frame m to a receiver. The grant may be of any size (e.g., small, medium, or large) and may be dependent on various factors such as the amount of data to send, the priority of the data, the available resources, the channel conditions, etc. A larger grant may correspond to a larger packet, more packets, more resources, more advanced transmission techniques (e.g., MIMO), etc. Conversely, a smaller grant may correspond to a smaller packet, fewer packets, less resources, more simple transmission techniques (e.g., SISO), etc.

The receiver may receive and process the transmission from the transmitter. The receiver may require more processing time for a larger grant, and vice versa. The receiver may send ACK information in frame $m+D_1$ for a small grant, in frame $m+D_2$ for a medium grant, or frame $m+D_3$ for a large grant, where $D_3 > D_2 > D_1$. The receiver may have processing time of $t_{RX\_PROC1}$ for a small grant, processing time of $t_{RX\_PROC2}$ for a medium grant, or processing time of $t_{RX\_PROC3}$ for a large grant, where $t_{RX\_PROC3} > t_{RX\_PROC2} > t_{RX\_PROC1}$.

In the example shown in FIG. 3, the receiver may send ACK information in one of three frames depending on whether the grant is small, medium or large. In general, the receiver may send ACK information in one of multiple frames depending on the grant size. The frame used to send ACK information may be selected to provide the receiver with more processing time for a larger grant, and vice versa.

The techniques described herein may be used for frequency division duplexed (FDD) systems as well as time division duplexed (TDD) systems. For FDD, the forward and reverse links may be allocated separate frequency channels. Transmissions may be sent simultaneously on the forward and reverse links via the frequency channels allocated for these links. For TDD, the forward and reverse links may share the same frequency channel. Some of the available transmission time may be allocated to the forward link, and the remaining transmission time may be allocated to the reverse link. Transmissions may be sent on each link in the time allocated for that link.

ACK transmission with a configurable timeline, e.g., shown in FIG. 3, may be used for both FDD and TDD systems. A transmitter may send packet transmissions in frames of one HARQ interlace for a first link, e.g., the forward link. A receiver may send ACK information in frames for a second link, e.g., the reverse link. The packet transmission and ACK transmission may be sent on different frequency channels in an FDD system and on the same frequency channel in a TDD system.

The techniques described herein may be especially applicable for an asymmetric partition in a TDD system. With asymmetric partition, the amount of time allocated for the forward link may be different from the amount of time allocated for the reverse link. For example, in a U:V TDD configuration, U frames may be allocated for the forward link, the next V frames may be allocated for the reverse link, the next U frames may be allocated for the forward link, etc., where U≠V for asymmetric partition. Asymmetric partition may be used to allocate more frames to the link with more data traffic or higher load.

Figure 4:
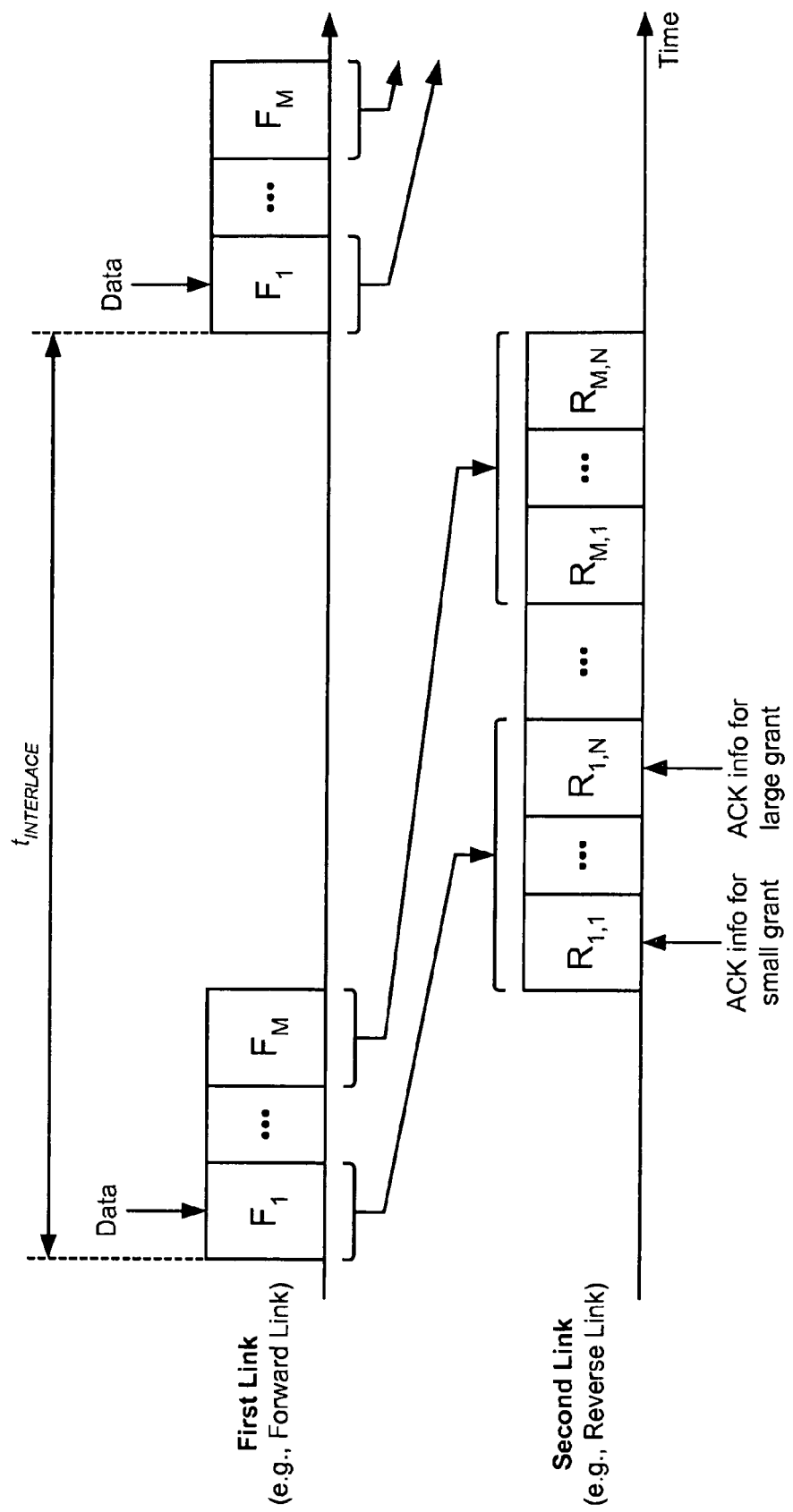
FIG. 4 shows an asymmetric partition for a time division duplexed system.

FIG. 4 shows a design of an asymmetric partition that may be applicable for a TDD system. In this design, M frames may be allocated for a first link, the next M*N frames may be allocated for a second link, the next M frames may be allocated for the first link, etc. In general, M and N may each be any value, with N=1 for symmetric partition and N>1 for asymmetric partition. Much of the description below assumes that N>1. The first and second links may correspond to the forward and reverse links, respectively, and more frames may be allocated for the reverse link. Alternatively, the first and second links may correspond to the reverse and forward links, respectively, and more frames may be allocated for the forward link.

In the design shown in FIG. 4, each frame for the first link may be associated with a set of N frames for the second link. The M frames in each burst for the first link may be assigned indices $F_1$ through $F_M$. The M*N frames in each burst for the second link may be divided into M sets with indices 1 through M, and each set may include N consecutive frames. The N frames in each set for the second link may be assigned indices $R_{m,1}$ through $R_{m,N}$, where m is the set index. Frame $F_m$ for the first link may be associated with set m containing frames $R_{m,1}$ through $R_{m,N}$ for the second link, where $m \in \{1, \ldots, M\}$.

A transmitter may send a transmission of data in frame $F_m$ on the first link. A receiver may receive and process the transmission and may send ACK information in one of N frames $R_{m,1}$ through $R_{m,N}$ on the second link, as shown in FIG. 4. The receiver may have the least amount of processing time if ACK information is sent in frame $R_{m,1}$, more processing time if ACK information is sent in frame $R_{m,2}$, and so on, and the most processing time if ACK information is sent in frame $R_{m,N}$.

In one design, the frame used to send ACK information on the second link may be selected based on the grant for the transmission of data sent in frame $F_m$ on the first link. The grant may indicate a payload size, which may be given by the number of packets to send and the number of bits in each packet. For example, the receiver may send ACK information in frame $R_{m,1}$ for a small grant, in frame for a large grant, or a frame between frames $R_{m,1}$ and $R_{m,N}$ for a medium grant. In general, the receiver may send ACK information in progressively later frame for progressively larger grant in order to obtain progressively more time to process the transmission of data.

In one design that may be applicable for both TDD and FDD systems, an ACK frame may be selected based on the amount of resources granted for a transmission of data. The granted resources may comprise a set of subcarriers, a set of resource blocks, one or more nodes in a channel tree, etc. A receiver may need more processing time for demodulation and other tasks when more resources are granted. A mapping between the amount of resources and ACK frame may be defined and may be known a priori by both the transmitter and the receiver. The transmitter and receiver can then ascertain the ACK frame based on the amount of granted resources and the known mapping.

In general, resources may be defined based on time, frequency, code, etc. In one design, resource blocks may be defined, with each resource block including a predetermined number of subcarriers (e.g., 12 subcarriers) in a predetermined time period (e.g., one frame). The system bandwidth may be partitioned into multiple (K) subcarriers with orthogonal frequency division multiplexing (OFDM) or single-carrier frequency division multiplexing (SC-FDM). The total number of subcarriers (K) may be dependent on the system bandwidth. For example, K may be equal to 128, 256, 512, 1024 or 2048 for system bandwidth of 1.25, 2.5, 5, 10 or 20 MHz, respectively. The number of available resource blocks may be dependent on the system bandwidth. The available resource blocks may be assigned for transmission of data.

In another design, a channel tree may be used to identify resources. The channel tree may constrain assignment of resources, which may reduce overhead to convey the granted resources.

Figure 5:
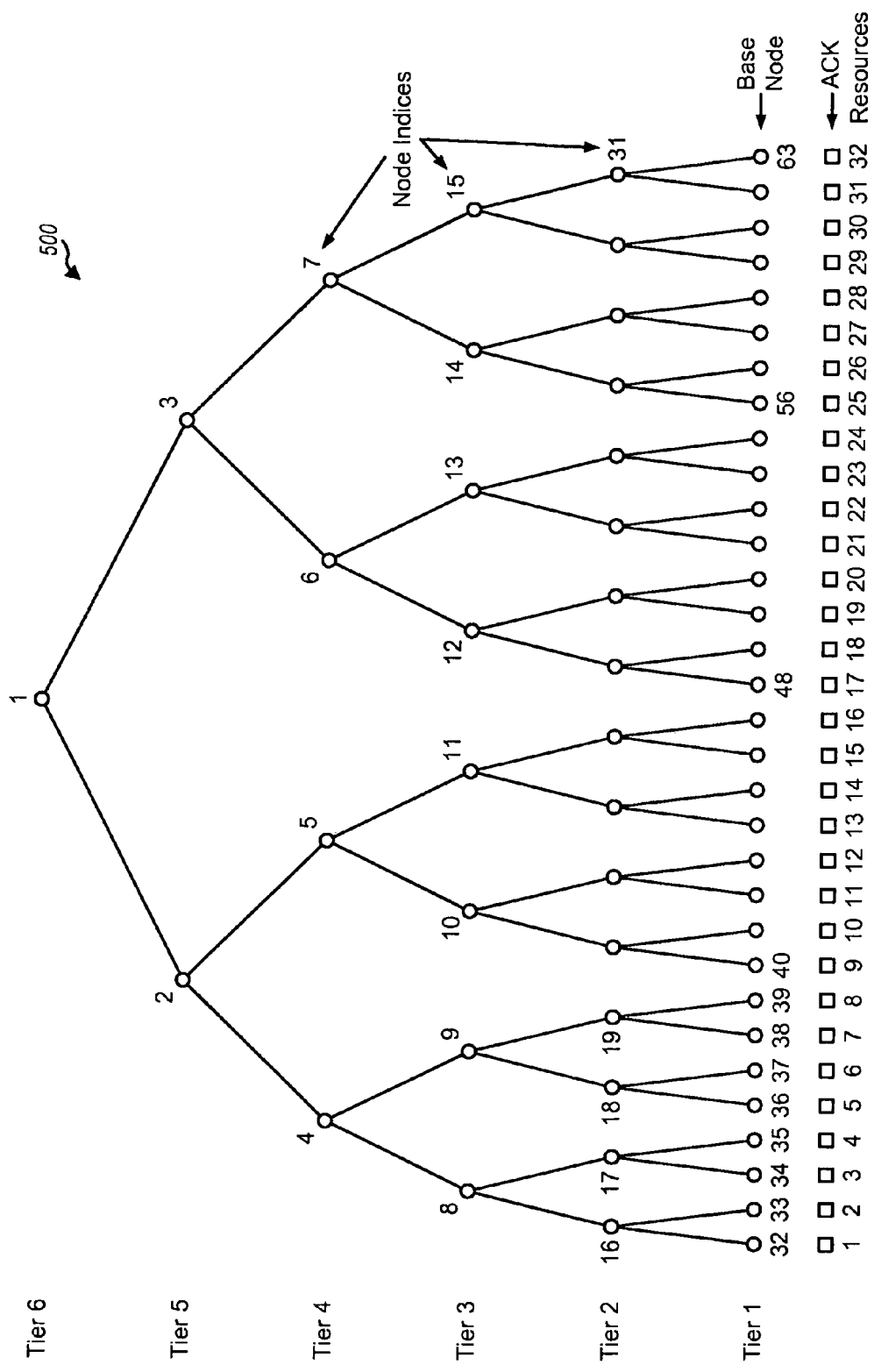
FIG. 5 shows an example channel tree.

FIG. 5 shows a design of a channel tree 500 for a case in which 32 subcarrier sets are available. Each subcarrier set may include one or more consecutive or non-consecutive subcarriers. In channel tree 500, 32 nodes may be formed in tier 1 with the 32 subcarrier sets, 16 nodes may be formed in tier 2 with the 32 nodes in tier 1, eight nodes may be formed in tier 3 with the 16 nodes in tier 2, four nodes may be formed in tier 4 with the eight nodes in tier 3, two nodes may be formed in tier 5 with the four nodes in tier 4, and one node may be formed in tier 6 with the two nodes in tier 5. Each node in tiers 2 through 6 may be formed with two nodes in the tier immediately below.

Each node in the channel tree may be assigned a unique node index or channel identifier (ID). The nodes may be assigned sequentially numbered indices from top to bottom and from left to right for each tier, as shown in FIG. 5. The topmost node 1 may include all 32 subcarrier sets. The 32 nodes 32 through 63 in the lowest tier 1 may be referred to as base nodes and may each include one subcarrier set. A node in the channel tree may be assigned for transmission of data. All subcarrier sets mapped to the assigned node may be used for transmission. For example, if node 9 is assigned, then the four subcarrier sets for base nodes 36 through 39 may be used for transmission.

The tree structure shown in FIG. 5 places certain restrictions on assignment of subcarriers. For each node that is assigned, all nodes that are descendants of the assigned node and all nodes for which the assigned node is a descendant are restricted. The restricted nodes are not used concurrently with the assigned node so that no two terminals use the same subcarrier set at the same time.

In one design, ACK information may be sent in progressively later frames for packet transmissions on nodes in progressively higher tiers. For example, ACK information may be sent in the first frame for packet transmissions on base nodes, in the next frame $R_{m,2}$ for packet transmissions on nodes in tier 2, and so on, and in the last frame $R_{m,N}$ for packet transmission on the topmost node 1 in tier 6. The mapping of nodes to ACK frames may be dependent on the number of tiers, the number of frames (N) available to send ACK information, etc. For example, if N=2, then ACK information may be sent in frame $R_{m,1}$ for packet transmissions on base nodes or in frame $R_{m,2}$ for packet transmissions on the remaining nodes.

In another design, each base node may be associated with a specific ACK resource. For example, 32 ACK resources with indices 1 through 32 may be defined for the 32 base nodes 32 through 63, respectively, as shown in FIG. 5. The receiver may send ACK information on an ACK resource with the lowest index among all ACK resource(s) for the assigned node. For example, the receiver may send ACK information on ACK resource 5 if node 9 is assigned, on ACK resource 7 if node 19 is assigned, or ACK resource 6 if node 37 is assigned. In this design, ACK resource 1 may carry ACK information for packet transmission on node 32, 16, 8, 4, 2 or 1. ACK resource 2 may carry ACK information for packet transmission on node 33. ACK resource 3 may carry ACK information for packet transmission on node 34 or 17. ACK resource 4 may carry ACK information for packet transmission on node 35. In this design, each ACK resource with an even index may be used for one base node and may be mapped to the first frame $R_{m,1}$. Each ACK resource with an odd index may be used for one or more base nodes and may be mapped to a later frame.

Several designs for mapping nodes in a channel tree to ACK frames/ACK resources have been described above. The nodes may also be mapped to ACK frames/ACK resources in other manners.

FIG. 5 shows an example channel tree that may be used to assign resources. In general, the available resources may be partitioned in any manner, e.g., using other channel trees or other resource partitioning schemes. ACK information may be sent in progressively later frames for packet transmissions on progressively more resources to provide more processing time for the receiver. The mapping between assignable resources and ACK frame/ACK resource may be known a priori by the transmitter and the receiver, which may then reduce signaling overhead.

For clarity, ACK transmission with a configurable timeline has been described above. In general, any transmission of control and/or other information that may be pertinent for data transmission may be sent using a configurable timeline. For example, a configurable timeline may be used for transmission of pilot, channel quality indicator (CQI) information, resource quality indicator (RQI) information, resource request, grants, etc. CQI information may provide received signal quality for all subcarriers or designated subcarriers and may be sent periodically. RQI information may provide received signal quality for specified subcarriers and may be sent when requested.

Figure 6:
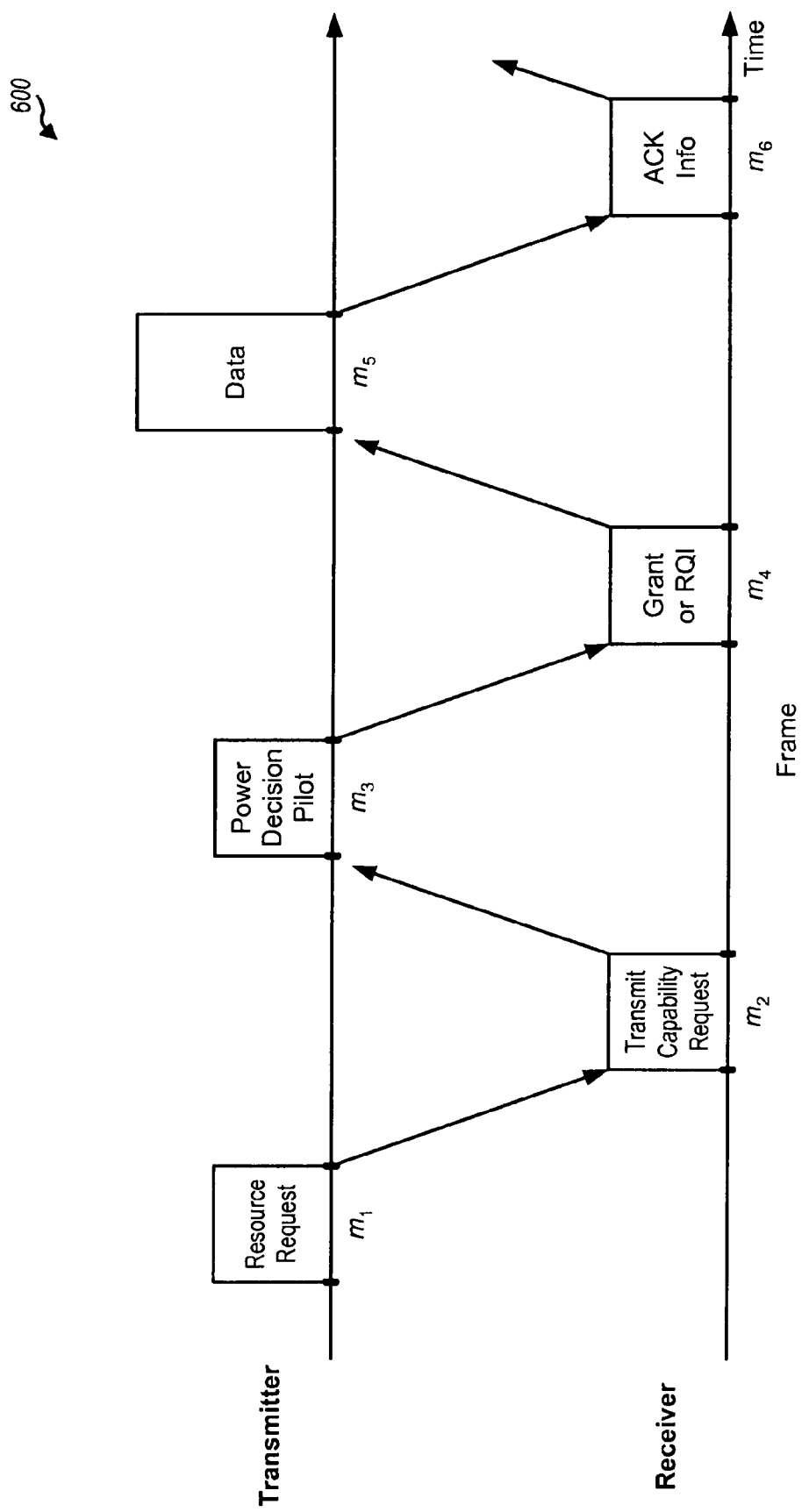
FIG. 6 shows an example data transmission scheme.

FIG. 6 shows a design of a data transmission scheme 600. A transmitter (e.g., a terminal) may have data to send to a receiver (e.g., a base station) and may send a resource request in frame $m_1$. The resource request may include a buffer size at the transmitter, an indication of the urgency of the resource request, etc. The receiver may receive the resource request and may send a transmit capability request to the transmitter in frame $m_2$ to ask for the transmit power capability of the transmitter for one or more specified resources.

The transmitter may receive the transmit capability request from the receiver and may determine the maximum transmit power level that it can use on the specified resources. For example, the transmitter may receive one or more reduce interference requests (not shown in FIG. 6) from other receivers observing high interference and may reduce its transmit power accordingly. The transmitter may convey its maximum transmit power level via a power decision pilot, which may be sent at this transmit power level in frame $m_3$.

The receiver may receive the power decision pilot from the transmitter and may determine the received signal quality of the specified resources based on the received pilot. The receiver (e.g., if it is a base station) may select an MCS based on the received signal quality. The receiver may then generate a grant, which may include the assigned resources, the selected MCS, the transmit power level to use for the assigned resources, etc. Alternatively, the receiver (e.g., if it is a terminal) may generate RQI information indicative of the received signal quality for the specified resources. The receiver may send the grant or the RQI information to the transmitter in frame $m_4$. The transmitter may receive the grant or RQI information and may process one or more packets in accordance with the grant or RQI information. The transmitter may then send a transmission of data on the assigned resources in frame $m_5$. The receiver may receive the transmission from the transmitter and decode the received transmission. The receiver may then send ACK information in frame $m_6$. The transmitter may send another transmission if a NAK is received and may terminate or send new data if an ACK is received.

FIG. 6 shows example messages and pilot that may be sent to support data transmission. In one design, the messages and pilot in FIG. 6 may be sent in fixed frames. For example, the transmitter may send its transmissions in frames $m_1$, $m_3$ and $m_5$ of one HARQ interlace. The receiver may also send its transmissions in frames $m_2$, $m_4$ and $m_6$ of one HARQ interlace. In another design, one or more of the messages and pilot in FIG. 6 may be sent in configurable frames. For example, the pilot may be sent in different frames depending on the processing time required by the receiver to perform channel estimation and/or other tasks. The grant or RQI information may also be sent in different frames depending on the processing time required by the transmitter to process one or more packets for transmission. The frames for sending RQI information may also be selected based on an assignment size, a potential maximum MIMO order or rank (e.g., which may be dependent on the capability of the receiver), and/or other factors. The assignment size may be related to the number of pilot decision pilot channels (PDPICHs) and/or other channels to be processed by the receiver. The resource request may be sent in different frames depending on the processing time required for scheduling and/or other tasks. The required processing time may be related to and may be estimated based on the amount of resources being requested, the amount of data to send, etc.

FIG. 7 shows a design of a process 700 for receiving a data transmission. Process 700 may be performed by a receiver, which may be a terminal for data transmission on the forward link or a base station for data transmission on the reverse link. The receiver may receive a grant for a transmission of data (block 712). The grant may indicate the amount of resources for the transmission of data, the amount of data to send, and/or other information. The receiver may receive the transmission of data in accordance with the grant (block 714), decode the received transmission to recover the data (block 716), and determine ACK information based on decoding result (block 718). The receiver may determine a frame to send the ACK information based on the grant (block 720). The determined frame may be one of multiple frames available for sending the ACK information. The receiver may then send the ACK information for the transmission of data in the determined frame (block 722).

In one design of block 720, different grant sizes may be associated with different frames for sending the ACK information. For example, progressively larger grants may be associated with frames progressively further away from the transmission of data to provide more receive processing time for the transmission of data. The receiver may determine the size of the grant and may determine a frame associated with the grant size as the frame for sending the ACK information.

In another design of block 720, the grant may indicate a node assigned for the transmission of data. The assigned node may be one of a plurality of nodes in a channel tree and may be associated with specific resources to use for the transmission of data. The receiver may determine a frame to send ACK information based on the assigned node. For example, each node in the channel tree may be associated with a specific frame for sending ACK information. The receiver may then determine the frame associated with the assigned node as the frame for sending the ACK information. In one design, a first frame that is closest to the transmission of data among the multiple frames may be used to send ACK information if the assigned node is a base node associated with the smallest amount of resources. A frame that is later than the first frame may be used to send ACK information if the assigned node is a higher-tier node associated with more than the smallest amount of resources. Other mapping of nodes in the channel tree to ACK frames may also be used.

The receiver may receive the transmission of data in a first frame on a first link and may send the ACK information in the determined frame on a second link. The multiple frames available for sending the ACK information may be associated with the first frame. For example, the first frame (e.g., frame $F_1$ in FIG. 4) and the multiple frames (e.g., frames $R_{1,1}$ to $R_{1,N}$ in FIG. 4) may be obtained with an asymmetric partition in a TDD system.

FIG. 8 shows a design of an apparatus 800 for receiving a data transmission. Apparatus 800 includes a module 812 to receive a grant for a transmission of data, a module 814 to receive the transmission of data in accordance with the grant, a module 816 to decode the received transmission to recover the data, a module 818 to determine ACK information based on decoding result, a module 820 to determine a frame to send the ACK information based on the grant, with the determined frame being one of multiple frames available for sending the ACK information, and a module 822 to send the ACK information for the transmission of data in the determined frame.

FIG. 9 shows a design of a process 900 for sending a data transmission. Process 900 may be performed by a transmitter, which may be a terminal for data transmission on the reverse link or a base station for data transmission on the forward link. The transmitter may determine a grant for a transmission of data (block 912). The transmitter may send the transmission of data in accordance with the grant (block 914). The transmitter may determine a frame to receive ACK information based on the grant (block 916). The determined frame may be one of multiple frames available for sending ACK information. The transmitter may then receive ACK information for the transmission of data in the determined frame (block 918).

In one design, different grant sizes may be associated with different frames for sending ACK information. The transmitter may determine the size of the grant and may determine the frame associated with the grant size as the frame to receive the ACK information. In another design, the grant may indicate a node in a channel tree assigned for the transmission of data. Each node in the channel tree may be associated with a specific frame for sending ACK information. The transmitter may determine the frame to receive the ACK information based on the assigned node.

FIG. 10 shows a design of an apparatus 1100 for sending a data transmission. Apparatus 1000 includes a module 1012 to determine a grant for a transmission of data, a module 1014 to send the transmission of data in accordance with the grant, a module 1016 to determine a frame to receive ACK information based on the grant, with the determined frame being one of multiple frames available for sending ACK information, and a module 1018 to receive ACK information for the transmission of data in the determined frame.

Figure 11:
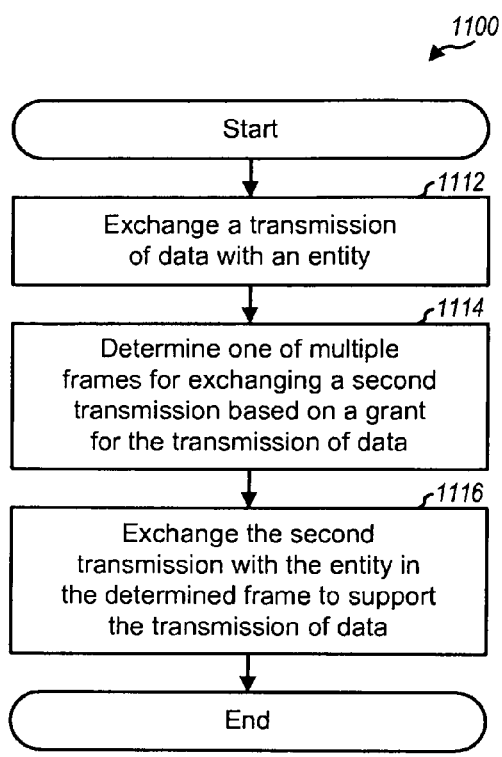
FIG. 11 shows a process for exchanging transmissions.

FIG. 11 shows a design of a process 1100 for exchanging transmissions. Process 1100 may be performed by a first entity, which may be a transmitter or a receiver. The first entity may exchange (e.g., send or receive) a transmission of data with a second entity (block 1112). The first entity may determine one of multiple frames for exchanging a second transmission based on a grant for the transmission of data (block 1114). The first entity may then exchange (e.g., receive or send) the second transmission with the second entity in the determined frame to support the transmission of data (block 1116).

In one design, the first entity is a transmitter, and the second entity is a receiver. The transmitter may send the transmission of data to the receiver in block 1112 and may receive the second transmission from the receiver in block 1116. In another design, the first entity may be a receiver, and the second entity may be a transmitter. The receiver may receive the transmission of data from the transmitter in block 1112 and may send the second transmission to the transmitter in block 1116.

In one design, the second transmission may be for ACK information and may be exchanged after the transmission of data. In other designs, the second transmission may be for pilot, CQI information, RQI information, a resource request, the grant, etc. In these designs, the second transmission may be exchanged before the transmission of data.

Figure 12:
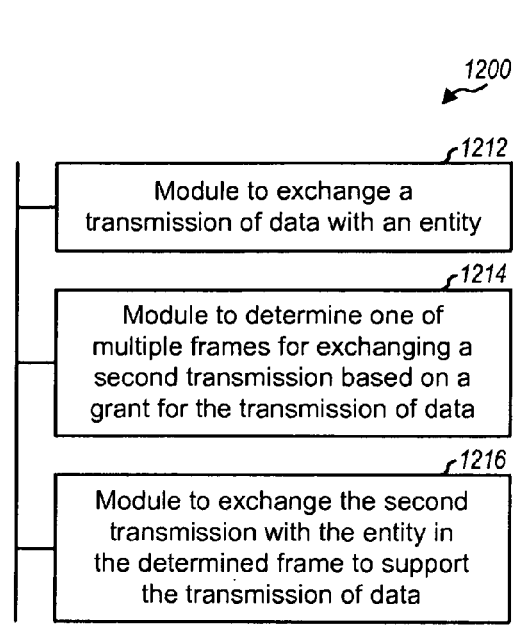
FIG. 12 shows an apparatus for exchanging transmissions.

FIG. 12 shows a design of an apparatus 1200 for exchanging transmissions. Apparatus 1200 includes a module 1212 to exchange (e.g., send or receive) a transmission of data with an entity, a module 1214 to determine one of multiple frames for exchanging a second transmission based on a grant for the transmission of data, and a module 1216 to exchange (e.g., receive or send) the second transmission with the entity in the determined frame to support the transmission of data.

The modules in FIGS. 8, 10 and 12 may comprise processors, electronics devices, hardware devices, electronics components, logical circuits, memories, software codes, firmware codes, etc., or any combination thereof.

Figure 13:
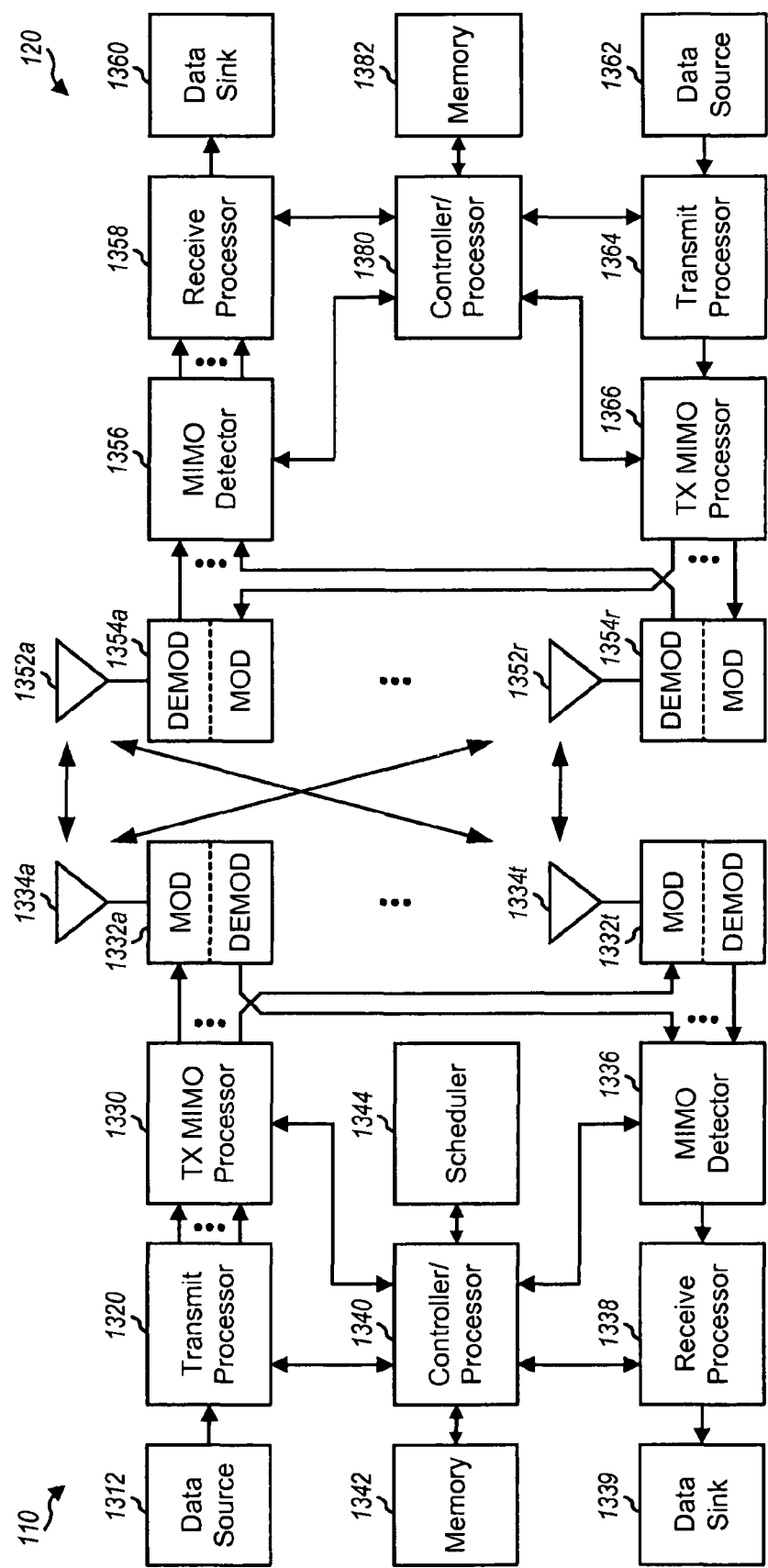
FIG. 13 shows a block diagram of a base station and a terminal.

FIG. 13 shows a block diagram of a design of a base station 110 and a terminal 120, which may be one of the base stations and one of the terminals in FIG. 1. In this design, base station 110 is equipped with T antennas 1334a through 1334t, and terminal 120 is equipped with R antennas 1352a through 1352r, where in general $T \geq 1$ and $R \geq 1$.

At base station 110, a transmit processor 1320 may receive packets of data from a data source 1312 and messages from a controller/processor 1340. For example, controller/processor 1340 may provide grants and other messages to support data transmission. Transmit processor 1320 may process (e.g., encode, interleave, and modulate) the data packets, messages, and pilot and provide data symbols, control symbols, and pilot symbols, respectively. A transmit (TX) MIMO processor 1330 may perform spatial processing (e.g., precoding) on the data symbols, the control symbols, and/or the pilot symbols, if applicable, and may provide T output symbol streams to T modulators (MODs) 1332a through 1332t. Each modulator 1332 may process a respective output symbol stream (e.g., for OFDM, SC-FDM, CDMA, etc.) to obtain an output sample stream. Each modulator 1332 may further process (e.g., convert to analog, amplify, filter, and upconvert) the output sample stream to obtain a forward link signal. T forward link signals from modulators 1332a through 1332t may be transmitted via T antennas 1334a through 1334t, respectively.

At terminal 120, antennas 1352a through 1352r may receive the forward link signals from base station 110 and may provide received signals to demodulators (DEMODs) 1354a through 1354r, respectively. Each demodulator 1354 may condition (e.g., filter, amplify, downconvert, and digitize) a respective received signal to obtain received samples. Each demodulator 1354 may further process the received samples (e.g., for OFDM, SC-FDM, CDMA, etc.) to obtain received symbols. A MIMO detector 1356 may obtain received symbols from all R demodulators 1354a through 1354r, perform MIMO detection on the received symbols if applicable, and provide detected symbols. A receive processor 1358 may process (e.g., demodulate, deinterleave, and decode) the detected symbols, provide decoded packets for terminal 120 to a data sink 1360, and provide decoded messages to a controller/processor 1380.

On the reverse link, at terminal 120, a transmit processor 1364 may receive and process packets of data from a data source 1362 and messages (e.g., for resource requests, ACK information, etc.) from controller/processor 1380. The symbols from transmit processor 1364 may be precoded by a TX MIMO processor 1366 if applicable, further processed by modulators 1354a through 1354r, and transmitted to base station 110. At base station 110, the reverse link signals from terminal 120 may be received by antennas 1334, processed by demodulators 1332, detected by a MIMO detector 1336 if applicable, and further processed by a receive processor 1338 to obtain the decoded packets and messages transmitted by terminal 120.

Controllers/processors 1340 and 1380 may direct the operation at base station 110 and terminal 120, respectively. Processor 1340 and/or other modules at base station 110 may perform or direct process 700 in FIG. 7, process 900 in FIG. 9, process 1100 in FIG. 11, and/or other processes for the techniques described herein. Processor 1380 and/or other modules at terminal 120 may also perform or direct process 700, process 900, process 1100, and/or other processes for the techniques described herein. Memories 1342 and 1382 may store data and program codes for base station 110 and terminal 120, respectively. A scheduler 1344 may schedule terminals for data transmission on the forward and/or reverse links and may provide grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving a transmission of data;
receiving a grant indicating a node assigned for the transmission of data, the assigned node being one of a plurality of nodes in a channel tree and associated with specific resources to use for the transmission of data;
sending acknowledgement (ACK) information for the transmission of data in one of multiple frames available for sending the ACK information, and
determining a frame to send the ACK information from among the multiple frames based on the assigned node, wherein the determining a frame to send the ACK information comprises selecting a first frame closest to the transmission of data among the multiple frames if the assigned node is a base node associated with a smallest amount of resources, and selecting a frame later than the first frame if the assigned node is a higher-tier node associated with more than the smallest amount of resources.

2. The method of claim 1, further comprising:
decoding the received transmission to recover the data; and
determining the ACK information based on the decoding result.

3. The method of claim 1, further comprising:
receiving a grant for the transmission of data, the grant indicating at least one of an amount of resources for the transmission of data and an amount of data to send; and
determining a frame to send the ACK information from among the multiple frames based on the grant.

4. The method of claim 3, wherein different grant sizes are associated with different frames for sending the ACK information, and wherein the determining a frame to send the ACK information comprises determining a size of the grant for the transmission of data, and determining a frame associated with the size of the grant as the frame for sending the ACK information.

5. The method of claim 3, wherein progressively larger grants are associated with frames progressively further away from the transmission of data to provide more receive processing time for the transmission of data.

6. The method of claim 1, wherein each node in the channel tree is associated with one of the multiple frames for sending the ACK information, and wherein the determining a frame to send the ACK information comprises determining a frame associated with the assigned node as the frame for sending the ACK information.

7. The method of claim 1, wherein the transmission of data is received in a first frame on a first link, and wherein the multiple frames are for a second link and are associated with the first frame.

8. The method of claim 7, wherein the first frame and the multiple frames are obtained with an asymmetric partition in a time division duplexed (TDD) system.

9. An apparatus for wireless communication, comprising:
at least one processor configured to:
receive a transmission of data;
receive a grant indicating a node assigned for the transmission of data, the assigned node being one of a plurality of nodes in a channel tree and associated with specific resources to use for the transmission of data;
send acknowledgement (ACK) information for the transmission of data in one of multiple frames available for sending the ACK information; and
determine a frame to send the ACK information from among the multiple frames based on the assigned node, wherein the frame to send the ACK information is determined by selecting a first frame closest to the transmission of data among the multiple frames if the assigned node is a base node associated with a smallest amount of resources, and by selecting a frame later than the first frame if the assigned node is a higher-tier node associated with more than the smallest amount of resources.

10. The apparatus of claim 9, wherein the at least one processor is configured to receive a grant for the transmission of data, the grant indicating at least one of an amount of resources for the transmission of data and an amount of data to send, and to determine a frame to send the ACK information from among the multiple frames based on the grant.

11. The apparatus of claim 10, wherein different grant sizes are associated with different frames for sending the ACK information, and wherein the at least one processor is configured to determine a size of the grant for the transmission of data, and to determine a frame associated with the size of the grant as the frame for sending the ACK information.

12. An apparatus for wireless communication, comprising:
means for receiving a transmission of data;
means for receiving a grant indicating a node assigned for the transmission of data, the assigned node being one of a plurality of nodes in a channel tree and associated with specific resources to use for the transmission of data;
means for sending acknowledgement (ACK) information for the transmission of data in one of multiple frames available for sending the ACK information; and
means for determining a frame to send the ACK information from among the multiple frames based on the assigned node,
wherein the means for determining a frame to send the ACK information selects a first frame closest to the transmission of data among the multiple frames if the assigned node is a base node associated with a smallest amount of resources, and selects a frame later than the first frame if the assigned node is a higher-tier node associated with more than the smallest amount of resources.

13. The apparatus of claim 12, further comprising:
means for receiving a grant for the transmission of data, the grant indicating at least one of an amount of resources for the transmission of data and an amount of data to send; and
means for determining a frame to send the ACK information from among the multiple frames based on the grant.

14. The apparatus of claim 13, wherein different grant sizes are associated with different frames for sending the ACK information, and wherein the means for determining a frame to send the ACK information comprises means for determining a size of the grant for the transmission of data, and means for determining a frame associated with the size of the grant as the frame for sending the ACK information.

15. A computer program product, comprising:
a non-transitory computer-readable medium comprising:
code for causing at least one computer to receive a transmission of data,
code for causing at least one computer to receive a grant indicating a node assigned for the transmission of data, the assigned node being one of a plurality of nodes in a channel tree and associated with specific resources to use for the transmission of data;
code for causing the at least one computer to send acknowledgement (ACK) information for the transmission of data in one of multiple frames available for sending the ACK information, and
code for causing the at least one computer to determine a frame to send the ACK information from among the multiple frames based on the assigned node,
wherein the code for causing the at least one computer to determine the frame to send the ACK information comprises code for causing the at least one computer to select a first frame closest to the transmission of data among the multiple frames if the assigned node is a base node associated with a smallest amount of resources, and code for causing the at least one computer to select a frame later than the first frame if the assigned node is a higher-tier node associated with more than the smallest amount of resources.

16. A method for wireless communication, comprising:
determining a node assigned for a transmission of data, the assigned node being one of a plurality of nodes in a channel tree and associated with specific resources to use for the transmission of data;
sending the transmission of data;
determining a frame to receive acknowledgement (ACK) information for the transmission of data from one of multiple frames available for sending the ACK; and
receiving the ACK information for the transmission of data in the frame determined to receive the ACK information,
wherein determining the frame to send the ACK information comprises code for causing the at least one computer to select a first frame closest to the transmission of data among the multiple frames if the assigned node is a base node associated with a smallest amount of resources, and code for causing the at least one computer to select a frame later than the first frame if the assigned node is a higher-tier node associated with more than the smallest amount of resources.

17. The method of claim 16, further comprising:
determining a grant for the transmission of data; and
determining a frame to receive the ACK information from among the multiple frames based on the grant.

18. The method of claim 17, wherein different grant sizes are associated with different frames for sending the ACK information, and wherein the determining a frame to receive the ACK information comprises determining a size of the grant for the transmission of data, and determining a frame associated with the size of the grant as the frame to receive the ACK information.

19. An apparatus for wireless communication, comprising:
at least one processor configured to:
determine a node assigned for a transmission of data, the assigned node being one of a plurality of nodes in a channel tree and associated with specific resources to use for the transmission of data;
send a the transmission of data, and to data;
determine a frame to receive acknowledgement (ACK) information for the transmission of data from one of multiple frames available for sending the ACK; and
receive acknowledgement (ACK) the ACK information for the transmission of data in one of multiple frames available for sending the ACK information the frame determined to receive the ACK information,
wherein the frame to send the ACK information is determined by selecting a first frame closest to the transmission of data among the multiple frames if the assigned node is a base node associated with a smallest amount of resources, and by selecting a frame later than the first frame if the assigned node is a higher-tier node associated with more than the smallest amount of resources.

20. The apparatus of claim 19, wherein the at least one processor is configured to determine a grant for the transmission of data, and to determine a frame to receive the ACK information from among the multiple frames based on the grant.

21. The apparatus of claim 19, wherein different grant sizes are associated with different frames for sending the ACK information, and wherein the at least one processor is configured to determine a size of the grant for the transmission of data, and to determine a frame associated with the size of the grant as the frame to receive the ACK information.

22. A method for wireless communication, comprising:
exchanging a transmission of data with an entity;
determining one of multiple frames for exchanging a second transmission based on a grant for the transmission of data; and exchanging the second transmission with the entity in the determined frame to support the transmission of data, wherein a node associated with the transmission of data is assigned from one of a plurality of nodes in a channel tree and associated with specific resources to use for the transmission of data, and wherein determining the one of the multiple frames comprises selecting a first frame closest to the transmission of data among the multiple frames if the assigned node is a base node associated with a smallest amount of resources, and selecting a frame later than the first frame if the assigned node is a higher-tier node associated with more than the smallest amount of resources.

23. The method of claim 22, wherein the second transmission comprises acknowledgement (ACK) information and is exchanged after the transmission of data.

24. The method of claim 22, wherein the second transmission comprises at least one of pilot, channel quality indicator (CQI) information, resource quality indicator (RQI) information, a resource request, and the grant and is exchanged before the transmission of data.

25. An apparatus for wireless communication, comprising:

at least one processor configured to exchange a transmission of data with an entity, to determine one of multiple frames for exchanging a second transmission based on a grant for the transmission of data, and to exchange the second transmission with the entity in the determined frame to support the transmission of data, wherein a node associated with the transmission of data is assigned from one of a plurality of nodes in a channel tree and associated with specific resources to use for the transmission of data, and wherein at least one processor determines the one of the multiple frames comprises selecting a first frame closest to the transmission of data among the multiple frames if the assigned node is a base node associated with a smallest amount of resources, and selecting a frame later than the first frame if the assigned node is a higher-tier node associated with more than the smallest amount of resources.

* * * * *